United States Patent [19]

Suzuki et al.

[11] Patent Number: 5,018,194
[45] Date of Patent: May 21, 1991

[54] ELECTRONIC SWITCHING SYSTEM HAVING CALL-FORWARDING FUNCTION

[75] Inventors: Takashi Suzuki, Tokyo; Etsuji Nakagiri, Kawasaki, both of Japan

[73] Assignee: Fujitsu Limited, Kawasaki, Japan

[21] Appl. No.: 379,254

[22] Filed: Jul. 13, 1989

[30] Foreign Application Priority Data

Jul. 13, 1988 [JP] Japan .................................. 63-174770

[51] Int. Cl.$^5$ ......................... H04M 3/54; H04M 7/06
[52] U.S. Cl. .................................. 379/207; 379/211; 379/230
[58] Field of Search ............... 379/211, 212, 230, 207, 379/210

[56] References Cited

U.S. PATENT DOCUMENTS 3,626,109 12/1971 Bartlett et al. ................... 379/211 X

FOREIGN PATENT DOCUMENTS

| 3007584 | 9/1981 | Fed. Rep. of Germany ...... 379/211 |
| 54-116809 | 9/1979 | Japan . |
| 0037865 | 2/1985 | Japan .................................. 379/212 |
| 60-264151 | 12/1985 | Japan . |
| 61-260750 | 11/1986 | Japan . |
| 0230250 | 10/1987 | Japan .................................. 379/211 |

Primary Examiner—Thomas W. Brown
Attorney, Agent, or Firm—Staas & Halsey

[57] ABSTRACT

An electronic switching system having a call-forwarding function for effecting call forwarding between subscribers. Discrimination information is added to call forwarding data for respective subscriber terminals. The discrimination information indicates whether or not each of the subscriber terminals is already registered as an elternative destination from the other subscriber terminals. When a call forward to one of the subscriber terminals is to be registered, the corresponding discrimination information is read. When the read discrimination information indicates that the subscriber terminal is not yet registered as an alternative destination, the subscriber terminal is allowed to be registered as an alternative destination. When the read discrimination information indicates that the subscriber terminal is already registered as an alternative destination, the subscriber terminal is inhibited from being registered as an alternative destination. An endless loop can be avoided at the stage of the call forward registration before execution of the call forward.

13 Claims, 14 Drawing Sheets

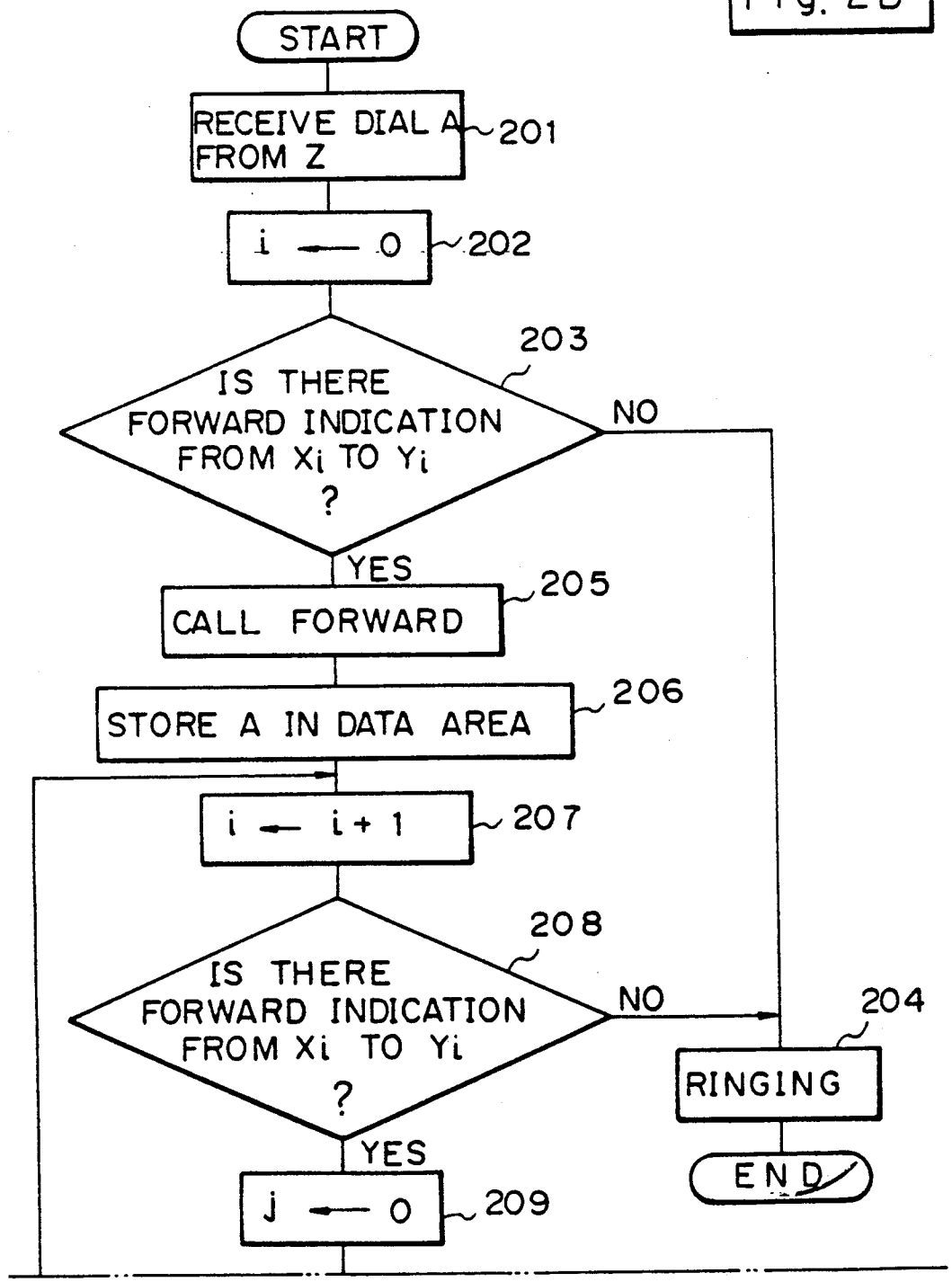

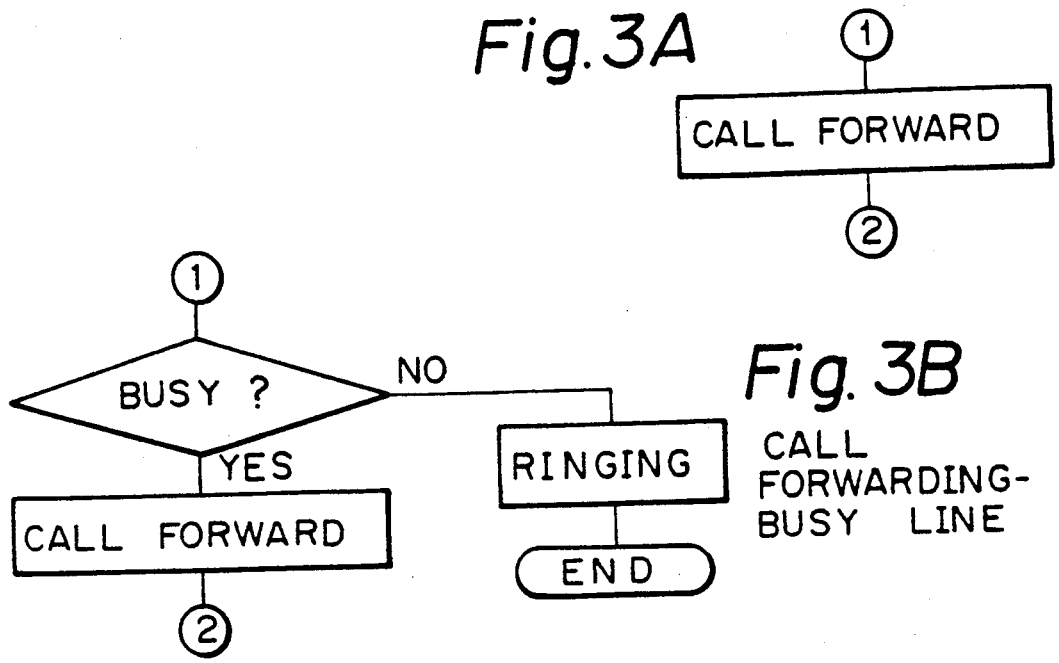
*Fig. 3A*
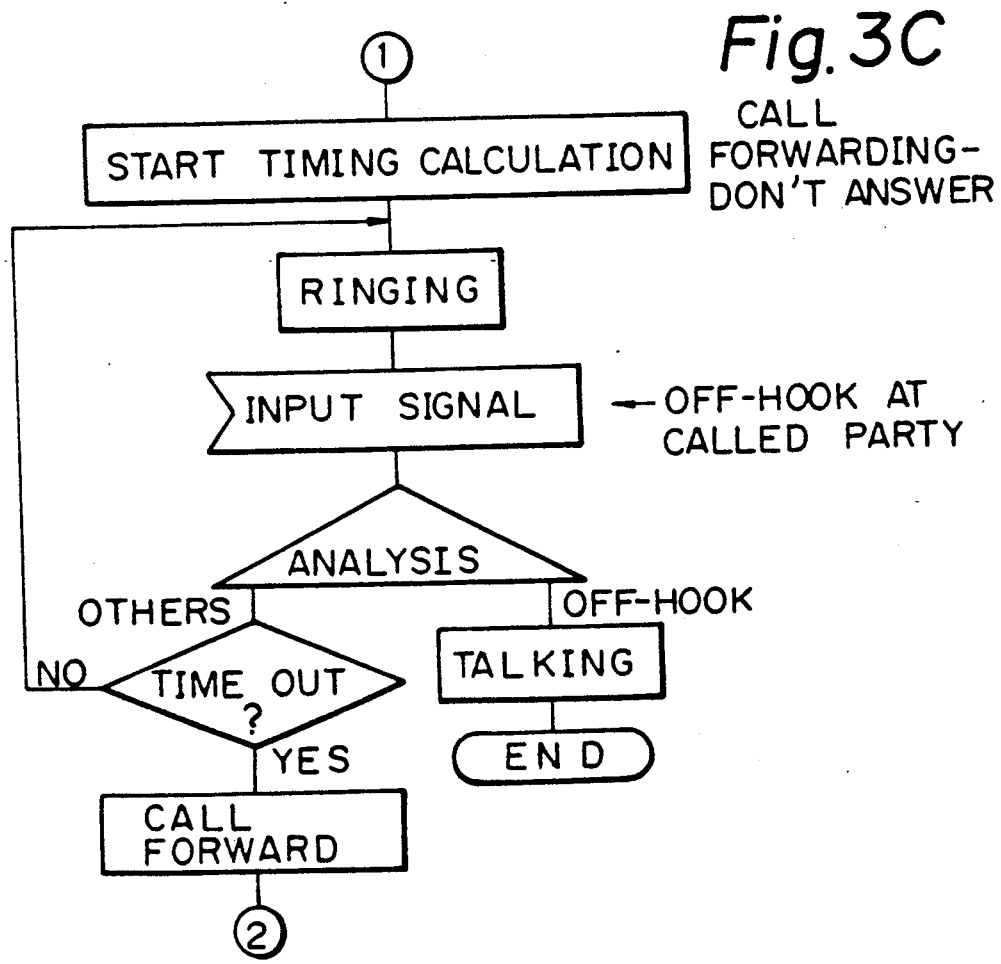
*Fig. 3B* CALL FORWARDING-BUSY LINE
*Fig. 3C* CALL FORWARDING-DON'T ANSWER

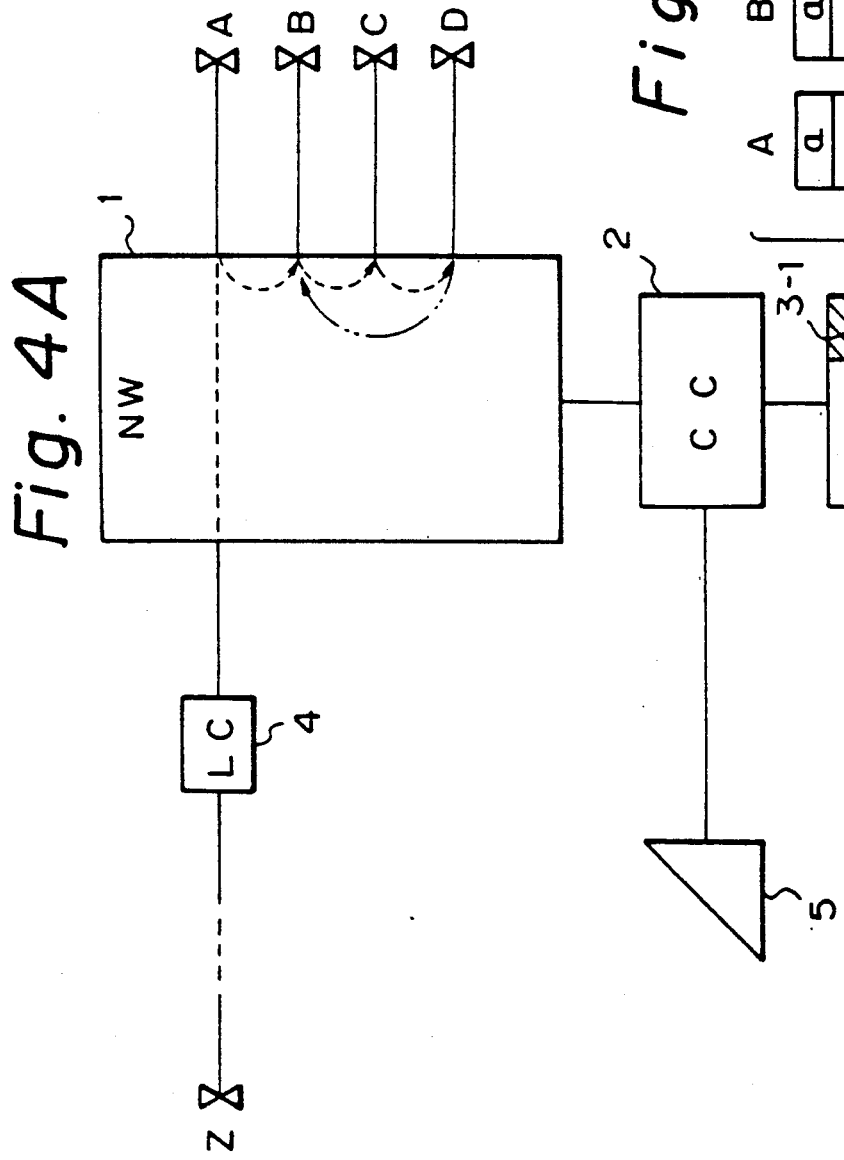

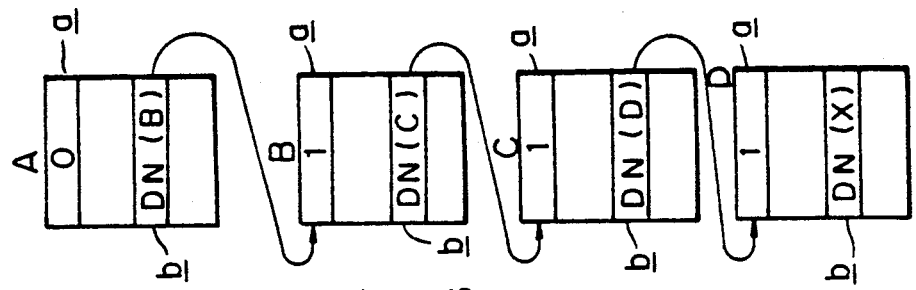
Fig. 8B
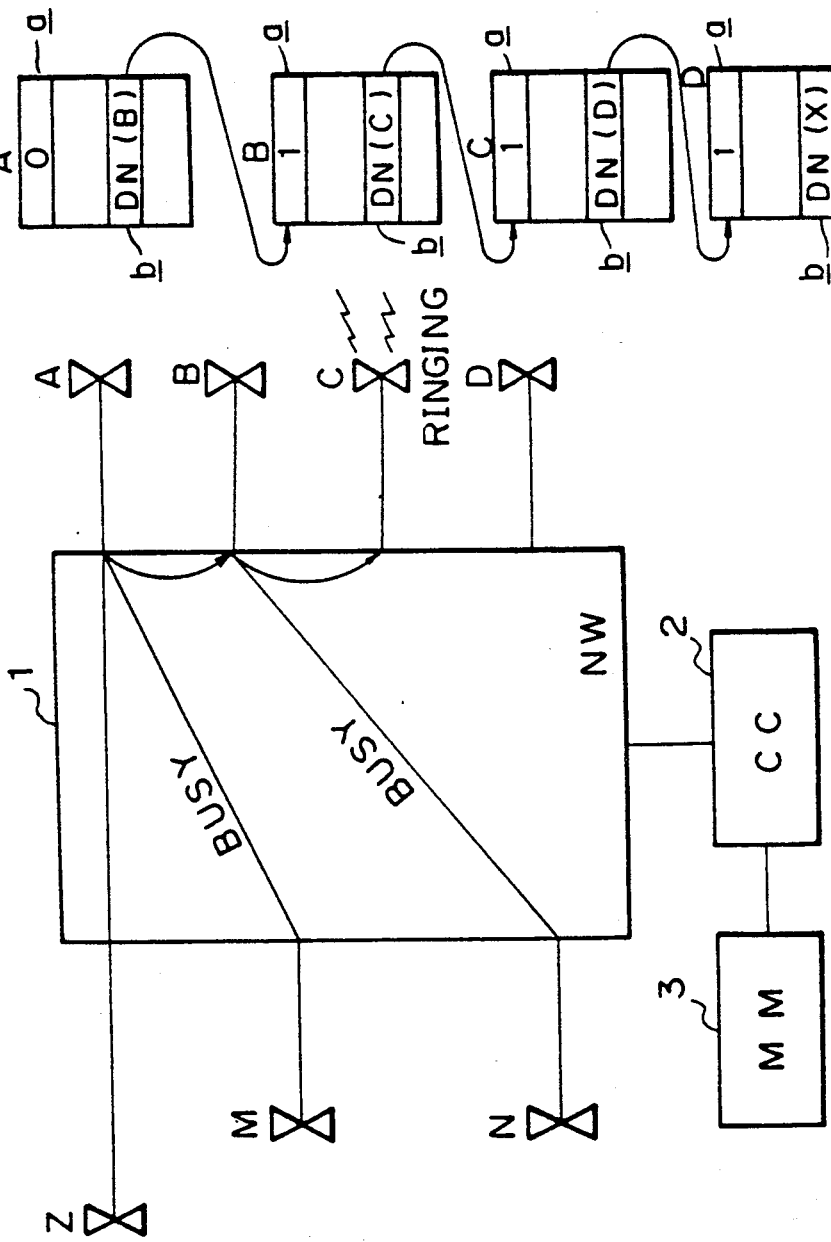
Fig. 8A  CALL FORWARDING-BUSY LINE

CALL FORWARDING DON'T ANSWER

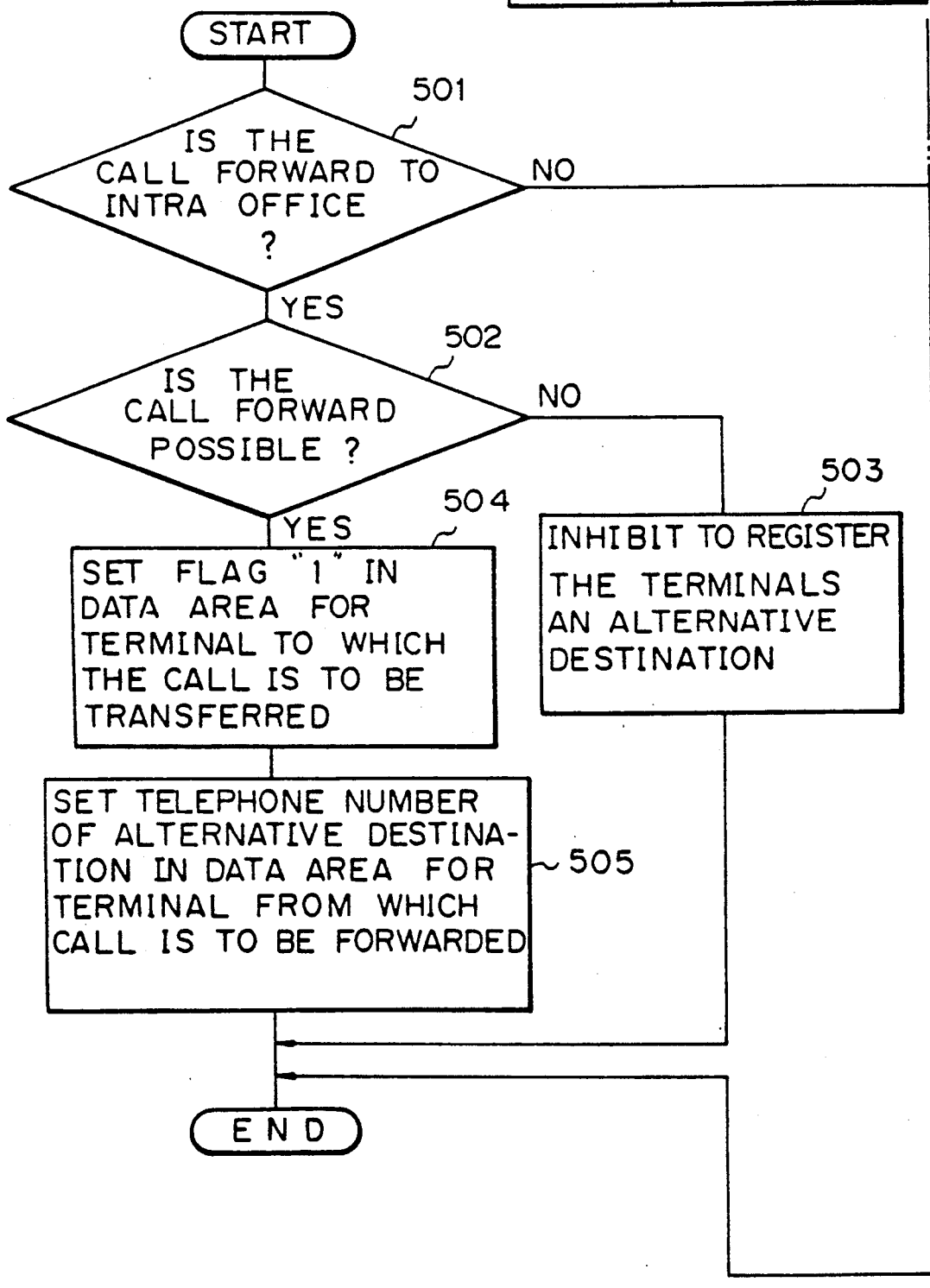

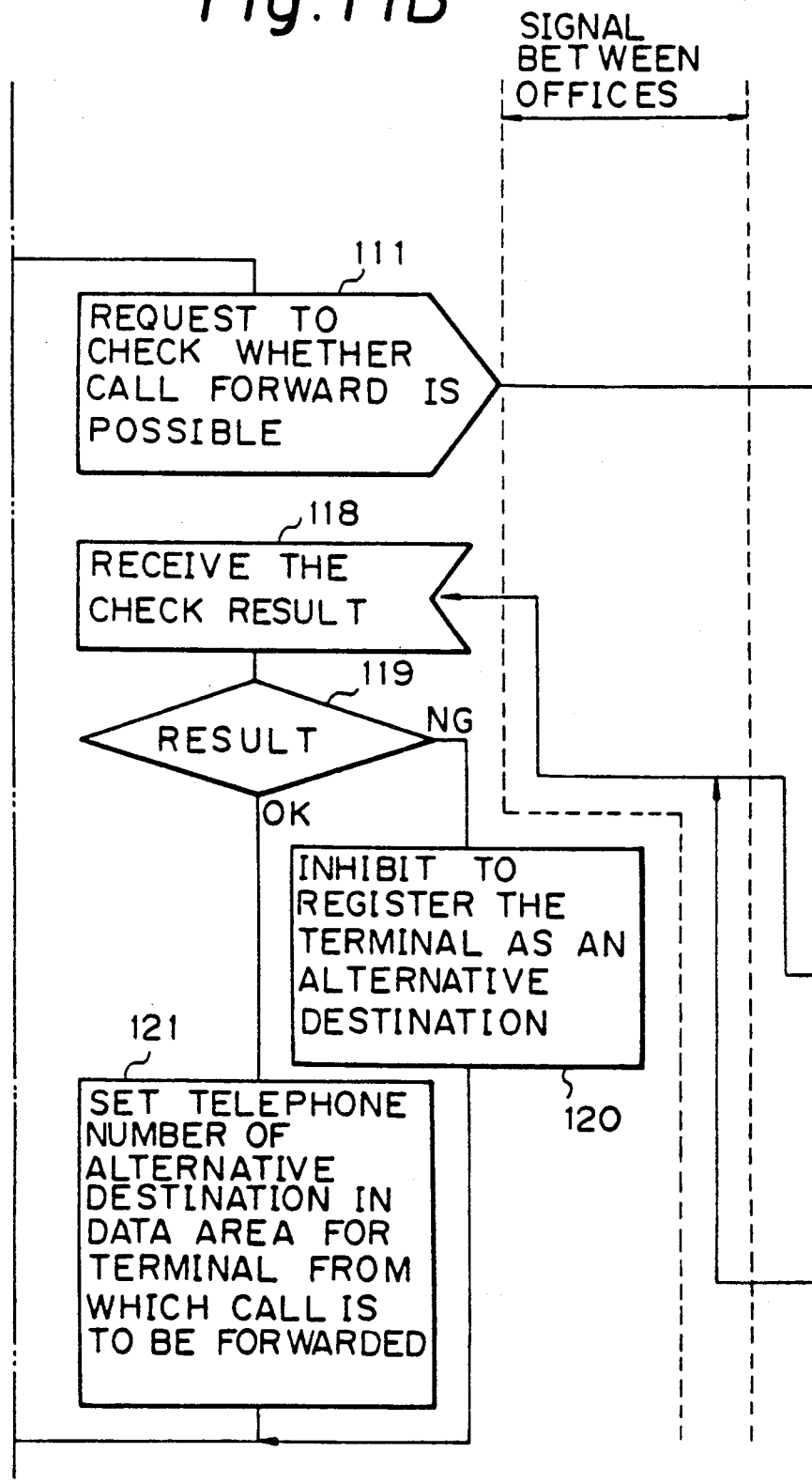

ELECTRONIC SWITCHING SYSTEM HAVING CALL-FORWARDING FUNCTION

BACKGROUND OF THE INVENTION

1. Field of the Invention

The present invention relates to an electronic switching system having a call-forwarding function for effecting call forwarding between subscriber terminals, based on data used for call forwarding stored in a storage unit in the electronic switching system which accommodates a plurality of subscriber terminals, and more particularly, it relates to a system for preventing an endless loop in the call forwarding process.

2. Description of the Related Art

As background art, there are known references as follows:

(a) Japanese Unexamined Patent Publication (Kokai) No. 61-260750 "A Call Forwarding Control System";

(b) Japanese Unexamined Patent Publication (Kokai) No. 54-116809 "A System for Preventing an Endless Loop Call Forwarding in an Incoming Forwarding Call"; and (c) Japanese Unexamined Patent Publication (Kokai) No. 60-264151 "A System for Registering the Number of an Alternative Destination to Which a Call is to be Forwarded".

The above reference (a) discloses a call transfer between offices in which a further forwarding is inhibited even when another alternative destination is registered. This reference does not disclose the endless loop avoiding technique for avoiding an endless loop which the present invention pertains to.

The above reference (b) discloses a technique for avoiding an endless loop forwarding. The endless loop is prevented, in this reference, by setting a flag during an execution of call forwarding and by checking the flag at each execution of the call forwarding. In contrast, in the present invention, the endless loop is prevented by inhibiting the registration as an alternative destination when an endless loop is anticipated.

The above reference (c) also discloses a technique for preventing an endless loop by calling an alternative destination at a time of registering a call and then registering the call after recognition of the response. If the response cannot be recognized, the registration is inhibited. In this technique, the processes at the time of registering are very complex and hardware is required to recognize the response. In contrast, in the present invention, whether or not an alternative destination is to be registered can easily be checked only by reading discrimination information which is registered before execution of the call forwarding.

As mentioned above, conventionally, there is known an electronic switching system having a call forwarding function which accommodates a plurality of subscriber terminals and includes a storage unit for storing data used to call forward for the subscriber terminals. Based on the data, a call forwarding, e.g., an operation of an intra-office call forwarding, can be executed between the subscriber terminals.

In the above conventional intra-office call forward processing system, a subscriber who wants to accept a call forwarding process conducts a so-called forward registering process (here, an intra-office call forward registering process) by specifying a subscriber terminal as an alternative destination and by registering it in the storage unit. During execution of a call forwarding, a call is forwarded to a terminal which is registered as an alternative destination.

Conventionally, it is not restricted to register one terminal as an alternative destination from a plurality of originating terminals, as later described in more detail with reference to the drawings. Therefore, an endless loop is established in the call forwarding process.

In the conventional art, the endless loop is avoided during the execution of the call forwarding. Therefore, there are problems in that various equipment is used until the process reaches the endless loop which makes the operation of this equipment unnecessary and thus wasteful, and that it is not easy to determine in the executing stage the call forwarding process as an endless loop.

SUMMARY OF THE INVENTION

The present invention has an object to resolve the above-mentioned problems and to provide an electronic switching system having a call-forwarding function which can avoid an endless loop in a call forwarding process at a stage before the forwarding process is executed.

To attain the above objects, there is provided, according to the present invention, an electronic switching system having a call-forwarding function for effecting call forwarding between subscribers, comprising a plurality of subscriber terminals, a switching network accommodating the subscriber terminals, a storage unit connected to the switching network, for storing data used to call forward for the subscriber terminals. Discrimination information is added to the data for respective subscriber terminals. The discrimination information indicates whether or not each of the subscriber terminals is already registered as an alternative destination from another subscriber terminal accommodated by the switching network. When a call forward to one of the subscriber terminals to another is to be registered in the storage unit, the discrimination information of another one of the subscriber terminals is read. When the discrimination information indicates that the other one of the subscriber terminals is not yet registered as an alternative destination, that one of the subscriber terminals is allowed to be registered as an alternative destination. When the discrimination information indicates that the other one of the subscriber terminals is already registered as an alternative destination, that other one of the subscriber terminals is inhibited to be registered as an alternative destination.

By the above construction of the present invention, a single and the same subscriber terminal are inhibited from being registered as an alternative destination for call forwardings from a plurality of other subscriber terminals at the stage of the registration which is carried out before executing the call forwardings. Therefore, the wasteful use of equipment is eliminated and complex processes to avoid an endless loop during the execution of the call forwardings are not necessary.

BRIEF DESCRIPTION OF THE DRAWINGS

The above objects and features of the present invention will be more apparent from the following description of the preferred embodiments with reference to the drawings, wherein:

FIG. 2, including FIGS. 2A and 2B, are flowcharts for explaining a conventional process for avoiding an endless loop during an execution of a call forward;

FIGS. 3A to 3C are flowcharts explaining variations in call forwarding in the step 203 in FIG. 2A;

FIG. 4A is a block diagram showing an electronic switching system according to an embodiment of the present invention; and FIG. 4B is a diagram of the subscriber terminals and the call forward tables in the data area 3-1 in FIG. 4A.

FIG. 8A is a block diagram of an electronic switching system for explaining a call forwarding-busy line state, according to another embodiment of the present invention;

FIG. 8B is a diagram of the contents of the call forward tables of the respective subscriber terminals as shown in FIG. 8A;

FIG. 10A is a block diagram of an electronic switching system for explaining a call forward between offices by utilizing a common signaling system, according to still another embodiment of the present invention;

FIG. 10B is a diagram of the contents of call forward tables for each terminal in each of the offices as shown in FIG. 10A; and FIG. 11 including FIGS. 11A–11C is a flowchart explaining the registration of call forwarding between offices, according to the embodiment shown in FIG. 10A.

DESCRIPTION OF THE PREFERRED EMBODIMENTS

For better understanding of the present invention, a conventional method of call forwarding is first described with reference to FIG. 1, FIGS. 2A and 2B, and FIGS. 3A to 3C.

In the conventional intra-office call forward processing system, a plurality of subscriber terminals can designate a single and the same subscriber terminal as an alternative destination for call forwarding. For example, referring to FIG. 1, an example of a call forward registering by a conventional intra-office call forward processing system is illustrated, in which, within an office, there are four subscriber terminals A, B, C, and D. The subscriber terminal B is registered, in a storage unit provided in a switching network within the office, as an alternative destination for forwarding a call by the subscriber terminal B. Similarly, the subscriber terminal C is registered by the subscriber terminal B as an alternative destination for forwarding a call and the subscriber terminal D is registered by the subscriber terminal C as an alternative destination for forwarding a call. Further, the subscriber terminal B is also registered by the subscriber terminal D as an alternative destination for forwarding a call.

In this situation, the subscriber terminal B is registered as an alternative destination for call forwarding from a plurality of subscriber terminals, i.e., the subscriber terminal A and the subscriber terminal D. Therefore, in a conventional intra-office call forward processing system, it is not inhibited to register a single and the same alternative destination for call forwarding from a plurality of subscriber terminals. Assuming that such a registering process for call forwarding has been done as mentioned above, then as shown in FIG. 1, when a call from a terminal Z in another office is terminated to the subscriber terminal A, the call is forwarded to the subscriber terminal B; the call terminated to the subscriber terminal B is forwarded to the subscriber terminal C; the call terminated to the subscriber terminal C is forwarded to the subscriber terminal D; and the call terminated to the subscriber terminal D is forwarded again to the subscriber terminal B. After this, the call forwarding process falls into an endless loop of the subscriber terminal B→the subscriber terminal C→subscriber terminal D→the subscriber terminal B→subscriber terminal C→. . . .

To avoid the endless loop, conventionally, during the execution of a call forwarding, the identification number of a terminal from which a call is being forwarded is previously registered in a fixed area in a storage unit within the office, and it is discriminated whether or not the identification number of a terminal to which a call is to be forwarded is the same as the identification number of the terminal from which the call is being forwarded.

Figure 1:
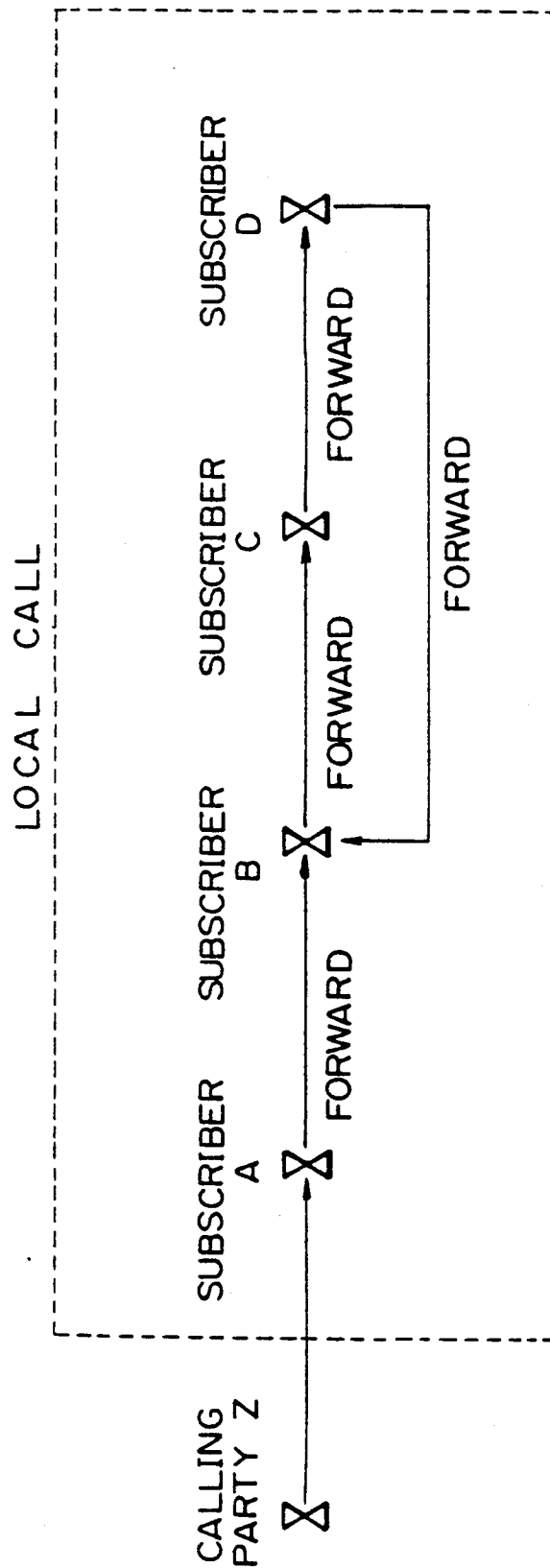
FIG. 1 is a diagram showing an example of a call forward registering by a conventional intra-office call forward processing system.
Figure 2B:
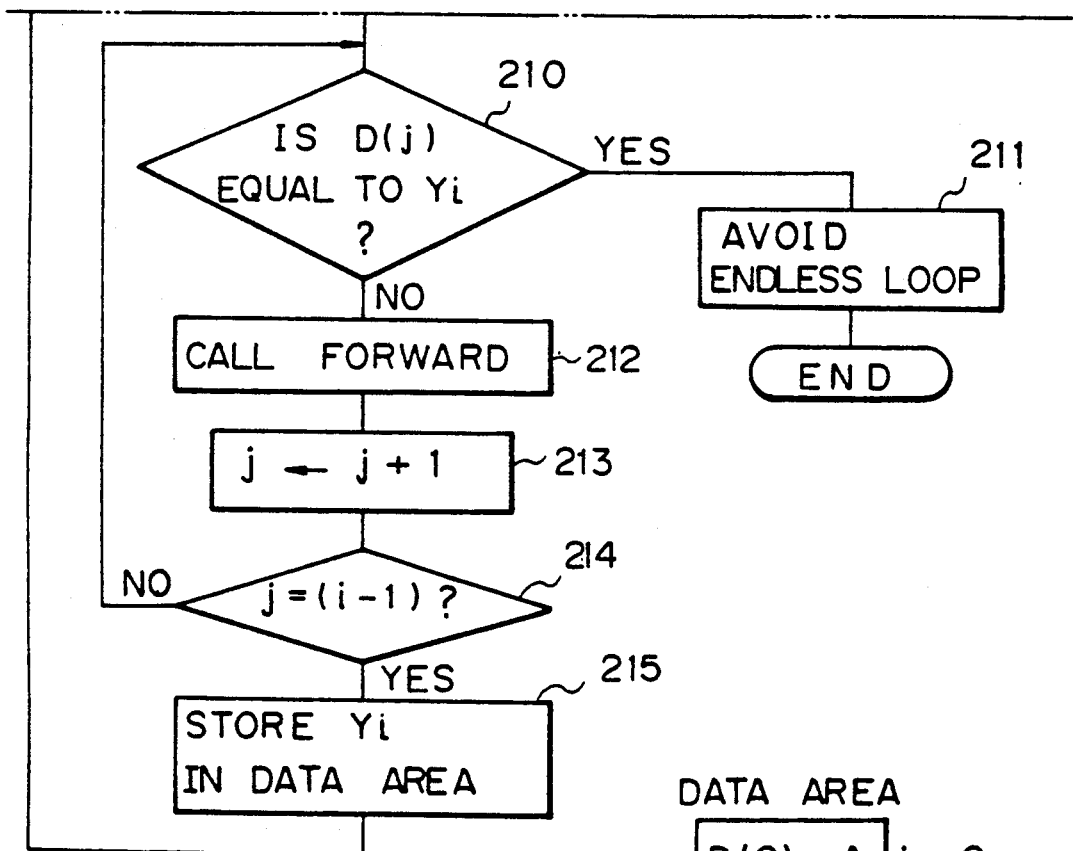

FIG. 2 including FIGS. 2A and 2B is a flowchart for explaining a conventional process for avoiding an endless loop during an execution of a call forwarding. Referring to FIGS. 1, 2A and 2B, at step 201, when the subscriber originator Z dials a telephone number of the destination terminal A an exchange receives the dialed number and recognizes that the destination terminal is A. When a call transfer services has been registered in advance in the destination terminal A, the exchange controls the call transfer from the terminal A to the terminal B. When the call transfer is registered to transfer a call from the terminal B through the terminal C to the terminal D, the call is transferred in the same way as above from the terminal B to the terminal C, and from the terminal C to the terminal D. At step 202, the number i is initialized to be zero. At step 203, a discrimination is made to determine whether or not there is a forward indication from A to B. If there is no forward indication with respect to the subscriber terminal A, the process goes to step 204 to effect a ringing operation at the terminal A. If there is a forward indication to forward the call to another terminal, a call forward is executed at step 205. There are various call forwarding operations as illustrated in FIGS. 3A to 3C. After the call forward from the terminal A to the terminal B, at the step 206, the identification number of the subscriber terminal A is registered in a data area (i=0) of the storage unit. Then, at step 207, the number i is incremented to deal with the subsequent terminals. At step 208, a discrimination is made to determine whether or not there is a forward indication from $X_i$ to $Y_i$. If there is no forward indication at step 207 with respect to the subscriber terminal $X_i$, the process goes to step 204 to effect a ringing operation at the terminal $X_i$. If there is a forward indication to forward the call to another terminal at step 207, then at step 208, a number j is initialized to be 0, and at step 210 a discrimination is made as to whether or not data D(j) is equal to $Y_i$. If D(j) is equal to $Y_i$, this means that the terminal from which a call is forwarded is the same as the terminal to which the call is being forwarded to make an endless loop. Therefore, at step 204, the endless loop is avoided by not forwarding the call to the terminal $Y_i$. If D(j) is not equal to $Y_i$, this means that no endless loop is formed at this stage. Then, at step 213, a call forward is performed. The same processes as the steps 210 to 212 are performed for each data B, C, and D by incrementing the number j up to (i−1) at the steps 213 and 214. When j becomes equal to (i−1), the data $Y_i$ is stored in the data area of the storage unit at step 215.

As described above, in the conventional call forward processing system, the avoidance of an endless loop is effected at the stage of the execution of the call forward so that various equipment used in the call forwarding process such as forwarding trunks in the office and so forth, are used immediately before the process falls into the endless loop. Therefore, various equipment is used wastefully in the process of avoiding the endless loop. Further, there are many steps required as shown by the steps 207 to 215 in FIGS. 2A and 2B, so that it is not easy to determine, during the execution of the call forward, if the forwarding path is an endless loop.

Of the call forwarding operation in the steps 205 or 212 shown in FIGS. 2A or 2B, respectively, there are at least three types as shown in FIGS. 3A to 3C. FIG. 3A shows a call forwarding without any special condition, including an absent transfer state. FIG. 3B shows a call forwarding of a busy-line transfer state. FIG. 3C shows a call forwarding of a don't (no) answer transfer state.

Next, embodiments of the present invention will be described. FIG. 4A is a block diagram showing an embodiment of the present invention. In FIG. 4, 1 is a switching network (NW) of an electronic switching system; 2 is a central control unit connected to the switching network; 3 is a storage unit connected to the central control unit 2; 3-1 is a data area for storing data used to call forward for subscriber terminals; 4 is a line circuit (LC); and 5 is an input terminal or keyboard for inputting data used for call forwarding. In FIG. 4B, A, B, C, and D are subscriber terminals accommodated by the switching network 1; 3-1A, 3-1B, 3-1C, and 3-1D are call forward data tables in the data area 3-1 used to forward calls at the subscriber terminals A, B, C, and D. Z in FIG. 4A is a terminal in another office. Note that, in each of the call forward data tables 3-1A, 3-1B, 3-1C, and 3-1D in FIG. 4B, there is provided a discrimination information area a and an area b. The area a stores discrimination information indicating whether or not the corresponding subscriber terminal is already registered as an alternative destination from any one of the other subscriber terminals accommodated by the switching network 1. The area b stores an identification number of a subscriber terminal which is registered as an alternative destination by the subscriber terminal corresponding to the table.

Figure 5:
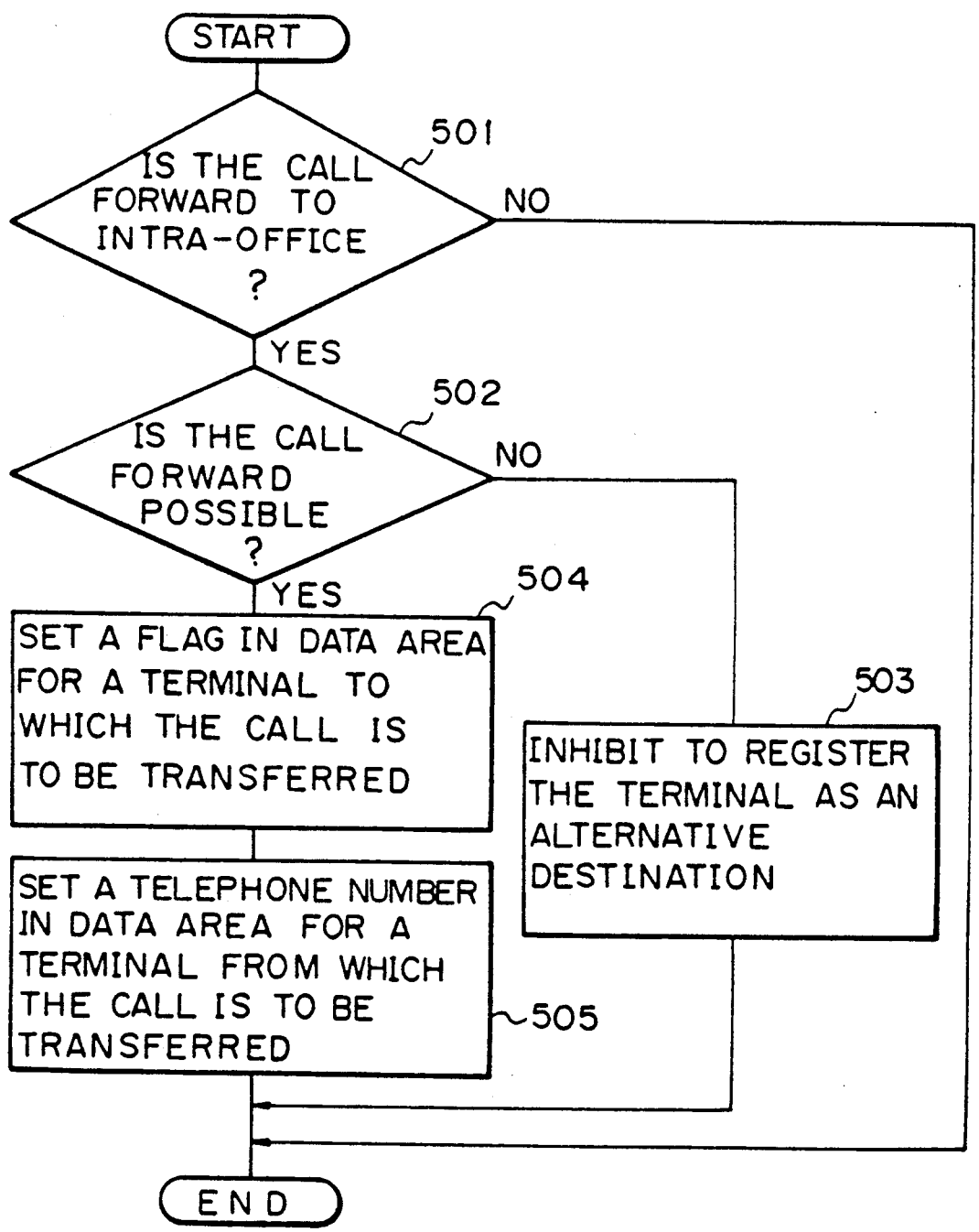
FIG. 5 is a flowchart for explaining a process for inhibiting registration of a terminal as an alternative destination before the execution of the call forward, according to an embodiment of the present invention.

FIG. 5 is a flowchart for explaining a process in the electronic switching system shown in FIG. 4 to inhibit registration of a terminal as an alternative destination before the execution of the call forwarding according to an embodiment of the present invention.

In FIG. 5, in the registering operation of a call forward, at step 501, a discrimination is made as to whether or not the alternative destination for the call forward is a subscriber terminal accommodated by the switching network 1.

If the answer is yes, it means that the call forward processing is an intra-office call forward so that the process goes to step 502 wherein, based on the discrimination information added to the data used for a call forwarding at the subscriber terminal designated as an alternative destination, it is discriminated whether or not the call forwarding to the registered subscriber terminal is possible.

If the answer is no at step 501, it means that the requested call forward is not a process for call forwarding within the office so the process goes to the end.

The discrimination at step 502 of whether or not the call forward to the designated subscriber terminal is possible is executed as follows. Namely, in each of the tables 3-1A, 3-1B, 3-1C, and 3-1D for call forwarding of the subscriber terminals accommodated by the switching network 1, there is the area a of the discrimination information for discriminating whether or not the subscriber terminal is already registered by another subscriber terminal as an alternative terminal for call forwarding. For the discrimination information in the area a, a flag of "1" or "0" may be employed. For example, when the flag is "1", it means that the corresponding subscriber terminal is already registered as an alternative destination for the call forward; and when the flag is "0", it means that the corresponding subscriber terminal is not yet registered as an alternative terminal. When the subscriber terminal is registered as an alternative terminal, i.e., when the flag is "1", the call forward to the intra-office terminal is recognized not to be possible at the step 502. Whereas, when the subscriber terminal is not yet registered as an alternative terminal, i.e., when the flag is "0", the call forward to the intra-office terminal is recognized to be possible at the step 502.

At the step 502, when the call forward to the intra-office terminal is recognized not to be possible, the subscriber terminal, which is designated as an alternative terminal, is inhibited to be registered as an alternative terminal at step 503.

At the step 502, when the call forward to the intra-office terminal is recognized to be possible, the flag "1" is set in the data area a in the table for the call forward of the subscriber terminal specified as the alternative terminal. Then, at step 505, the identification number, e.g., the telephone number of the subscriber terminal designated as the alternative destination, is registered as the number of the alternative destination into the area a of the table for the terminal from which the call is to be transferred.

The discrimination in the steps 501 and 502, and the data input of the discrimination information and the identification numbers into the areas a and b of the call forwarding tables 3-1A, 3-1B, 3-1C, and 3-1D may be effected by an operator through the call forwarding data input terminal 5 connected to the central control unit 2 or may be effected by respective subscribers through respective subscriber terminals.

The call forwarding registration according to the above-described embodiment is further described below in a practical example with reference to FIGS. 6A to 6E.

Figure 6A:
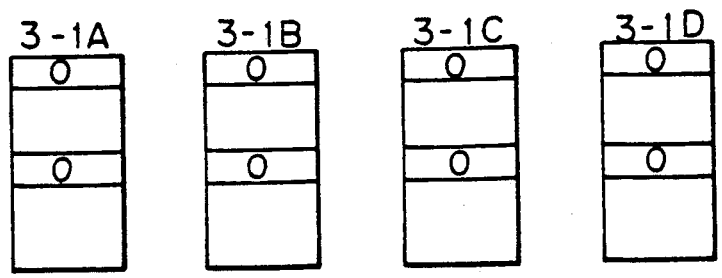
FIGS. 6A to 6E are diagrams showing the transition of the contents of call forward tables of respective subscriber terminals according to an embodiment of the present invention.
Figure 6B:
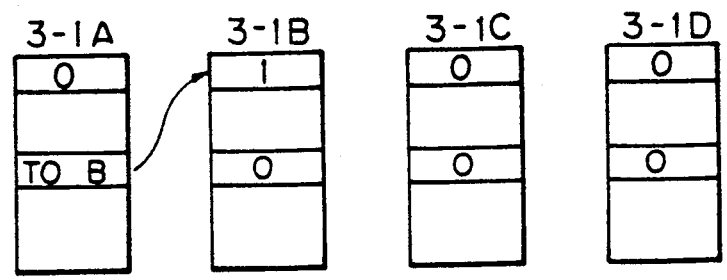
Figure 6C:
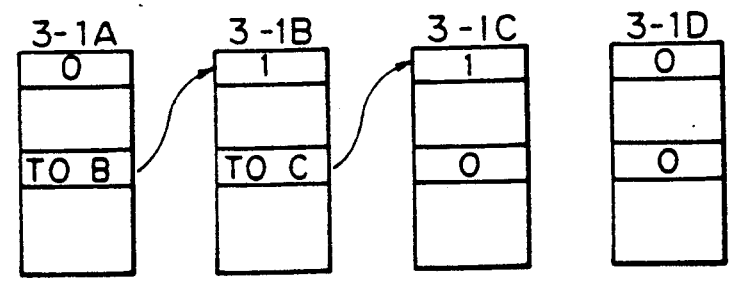
Figure 6D:
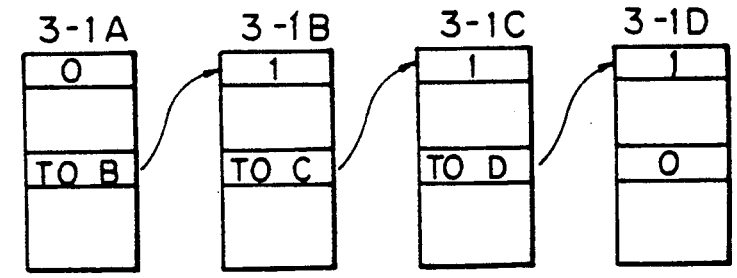
Figure 6E:
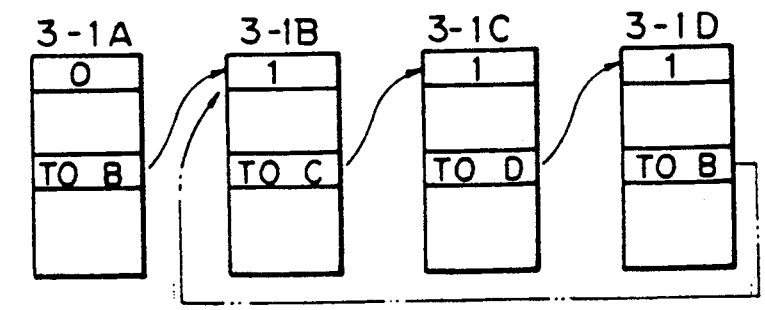

That is, at first, in a state where no terminal is yet registered as an alternative destination for call forwarding, all areas a of the subscriber terminals A to D have the flags "0", and all areas b have no identification number of an alternative destination for call forwarding (see FIG. 6A).

Then, when call forwarding is requested from the subscriber terminal A to the subscriber terminal B designated as an alternative destination, the discrimination of the step 502 is made by searching the area a in the table 3-1B of the subscriber terminal B. Since the flag in the area a of the subscriber terminal B is "0" at this time, it is determined that the call forwarding registration to an intra-office destination is possible so that the flag in the area a of the subscriber terminal B is changed to "1" at the step 504. The telephone number of the subscriber at terminal B which is the alternative destination for the call forward is set in the area b of the table 3-1A for the subscriber terminal A (see FIG. 6B).

After this, when call forwarding is requested from the subscriber terminal B to the subscriber terminal C designated as an alternative destination, the area a in the table 3-1C of the subscriber terminal C, which is the alternative destination for the call forward, is searched at the step 502. Since the flag in the area a of the subscriber terminal C is also "0" at this time, it is determined that the call forwarding registration to an intra-office destination is possible so that the flag in the area a of the subscriber terminal C is changed to "1" at the step 504 and the telephone number of the subscriber terminal C which is the alternative destination for the call forward is set in the area b of the table 3-1B for the subscriber terminal B (see FIG. 6C).

After this, when call forwarding is further requested from the subscriber terminal C to the subscriber terminal D designated as an alternative destination, the area a in the table 3-1D of the subscriber terminal D which is the alternative destination for the call forward is searched at the step 502. Since the flag in the area a of the subscriber terminal D is also "0" at this time, it is determined that the call forwarding registration to an intra-office destination is possible so that the flag in the area a of the subscriber terminal D is changed to "1" at the step 504 and the telephone number of the subscriber terminal D which is the alternative destination for the call forward is set in the area b of the table 3-1C for the subscriber terminal C (see FIG. 6D).

Then, for example, even if call forwarding is still further requested from the subscriber terminal D to the subscriber terminal B designated as an alternative destination, the flag in the area a of the subscriber terminal B has already been changed to "1" because the subscriber terminal B has already been specified as an alternative destination for the call forwarding by the subscriber terminal A. Therefore, by discriminating this, it is determined that the call forwarding registration to an intra-office destination from the subscriber terminal D to the subscriber terminal B is not possible. Accordingly, the request of the call forwarding registration from the subscriber terminal D to the subscriber terminal B designated as an alternative destination is rejected.

Figures 7A, 7B:
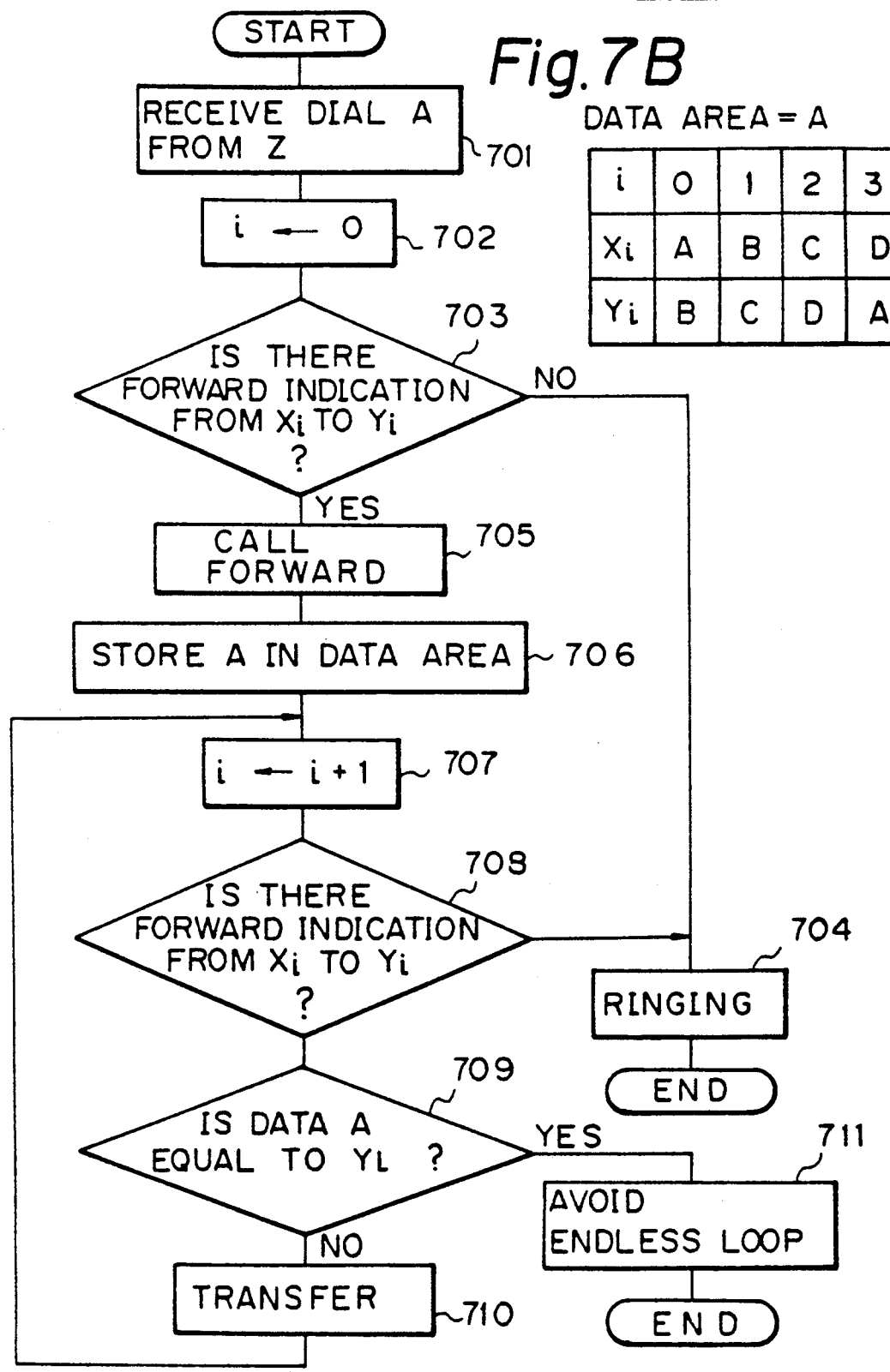
FIG. 7A is a diagram of the connection of subscriber terminals in a call forward processing system.
FIG. 7B is a flowchart for explaining the process to avoid an endless loop including the first subscriber terminal A, according to an embodiment of the present invention.

The above-described registration, however, cannot avoid registration of the first subscriber terminal A as a call forward destination from any of the remaining subscriber terminals B, C, and D, as shown in FIG. 7A, because the area a corresponding to the subscriber is "0". If a call forward is executed from any one of the subscribers B, C, and D, to the first subscriber terminal A based on the last mentioned registration, an endless loop will result. Therefore, according to the embodiment of the present invention, instead of avoiding the registration, only an endless loop through the first subscriber terminal A is avoided during the execution of the call forward.

FIG. 7B is a flowchart explaining the avoidance of the endless loop through the subscriber terminal A during the execution of the call forward.

In FIG. 7B, since steps 701 to 706 are the same as the steps 201 to 206 in FIG. 2A, the explanation is omitted here. In steps 707 to 711, the data A is compared with the data B, C, D or A designated as an alternative destination for a call forward, and when they coincide, the call forward is inhibited at the step 711.

The call forwarding process at the steps 705 or 710 is the same as the process at the steps 205 or 212 in FIGS. 2A and 2B, respectively. Modifications of the call forwarding are shown in FIGS. 3A to 3C as normal call forwarding, call forwarding-busy line state, and call forwarding-don't (no) answer state.

FIG. 8A is a block diagram showing an electronic switching system for explaining the call forwarding-busy line state, according to the present invention. In FIG. 8B, it is assumed that the areas a in the tables for the subscriber terminals A, B, C, and D, respectively have the flags "0", "1", "1", and "1", respectively. In the area b the dial numbers DN of the subscribers B, C, D/ and X (not shown in the figure), respectively, are stored. It is also assumed that the subscriber A is in communication with a subscriber M, and the subscriber B is in communication with a subscriber N. In this situation, when the subscriber Z calls the subscriber A, since the subscriber A is in communication with the subscriber M, the call is forwarded to the subscriber terminal B. The subscriber B, however, is in communication with the subscriber N, so the incoming call is further forwarded to the subscriber C. Since the subscriber C is not in communication, the incoming call at the subscriber terminal C causes it to ring.

Figure 9B:
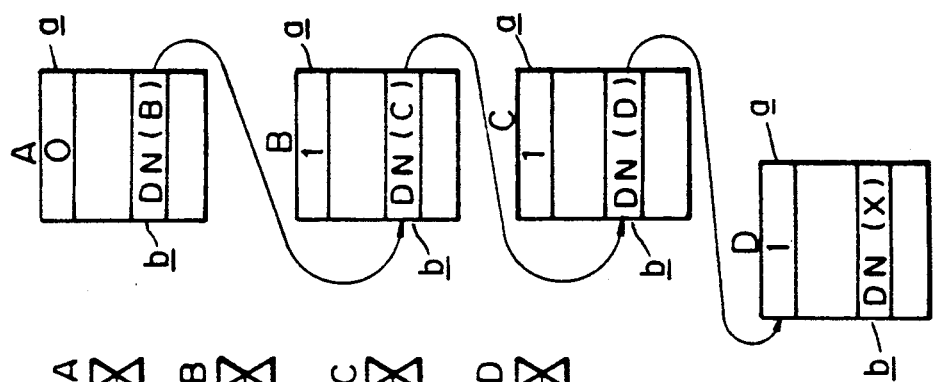
FIG. 9B is a diagram of the contents of the cell forward tables of the respective subscriber terminals as shown in FIG. 9A.
Figure 9A:
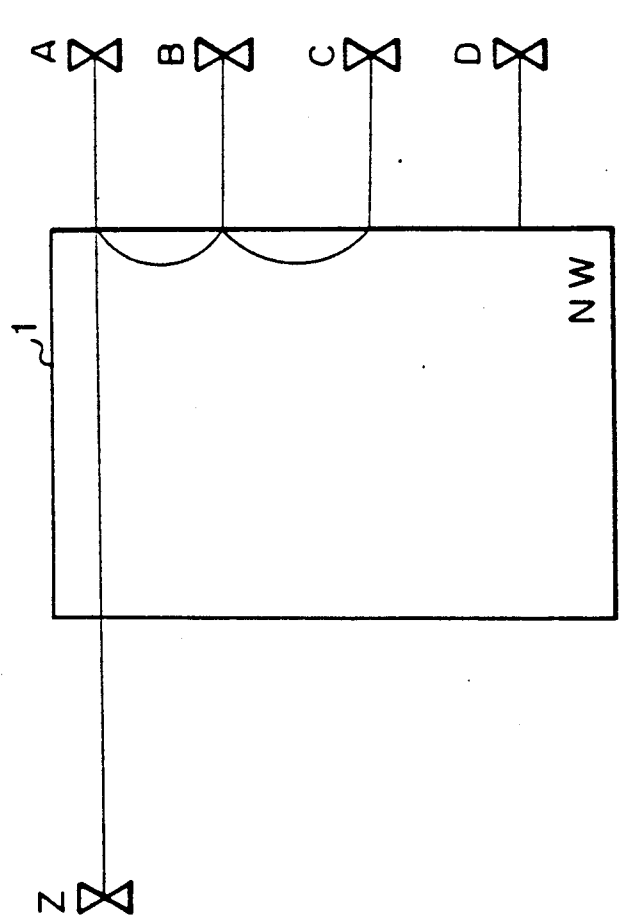
FIG. 9A is a block diagram of an electronic switching system for explaining a call forwarding-don't (no) answer state, according to still another embodiment of the present invention.

FIG. 9A is a block diagram showing the electronic switching system for explaining the call forwarding-don't (no) answer state, according to the present invention. FIG. 9B shows the tables for the subscriber terminals A, B, C, and D which are assumed to be the same as those shown in FIG. 8B. In the call forwarding-don't (no) answer state, when a subscriber does not answer a calling party for a certain period of time, for example 30 seconds, after the call, the call is forwarded to an alternative registered destination. Therefore, when the subscriber Z calls the subscriber A, a ringing operation is effected for 30 seconds at the subscriber terminal A. If there is no answer from the subscriber terminal A for 30 seconds, the call to the subscriber terminal A is transferred to the alternative destination which in this case is the subscriber terminal B. If there is also no answer from the subscriber terminal B for 30 seconds, the call to the subscriber terminal B is further transferred to the alternative destination which in this case is the subscriber terminal C. If the subscriber C responds to the incoming call by lifting the receiver off hook, communication is started between the subscribers Z and C.

The present invention is not restricted to intra-office call forwarding but can be applied, according to another embodiment of the present invention, to call forwarding between offices.

Figures 10A, 10B:
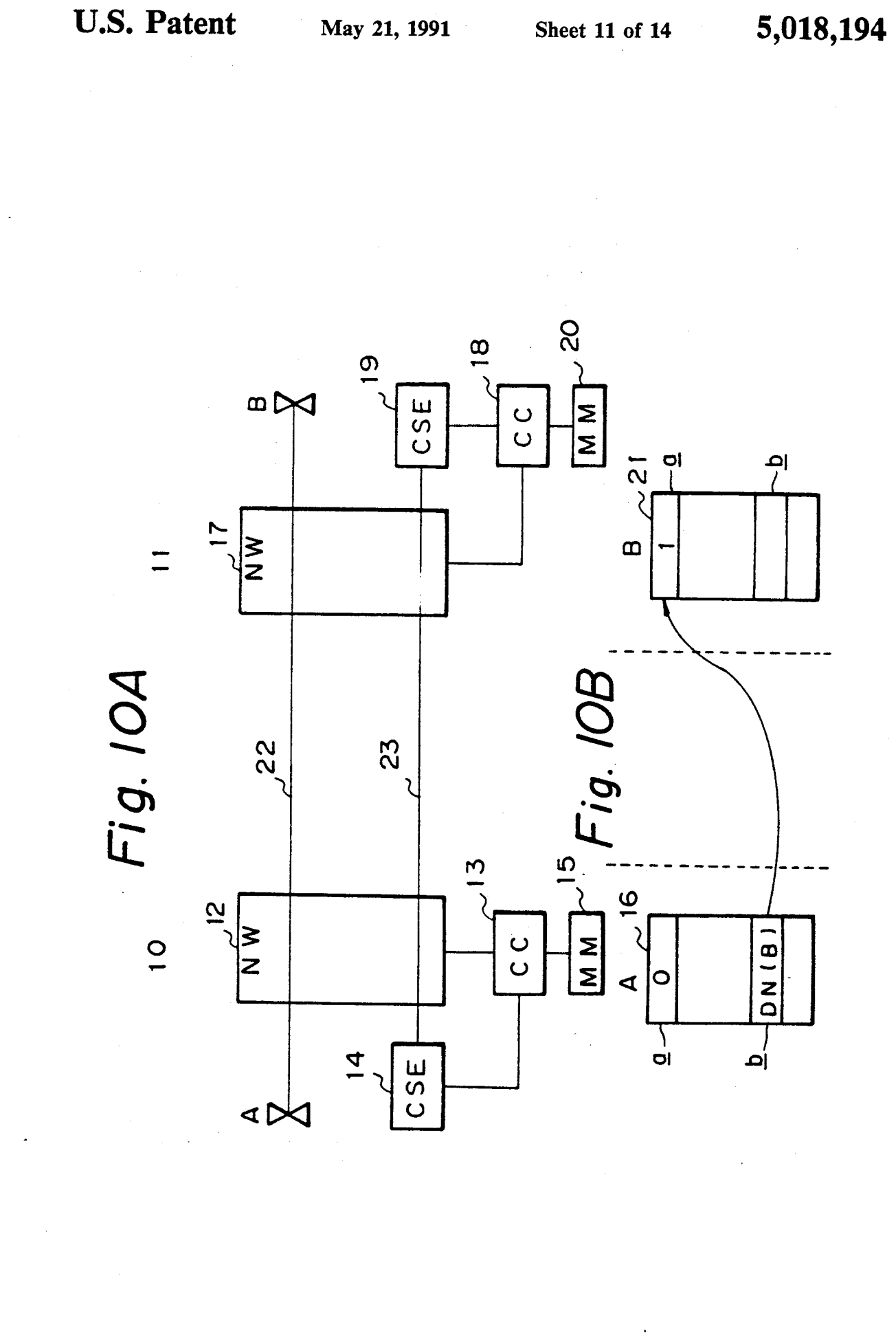

FIG. 10A is a block diagram showing another embodiment of the present invention. In FIG. 10A, there are two offices 10 and 11. The office 10 includes an electronic switching network 12 accommodating a subscriber terminal A, a central control unit 13, common channel signaling equipment (CAE) 14, and a main memory (MM) 15. In the main memory 15 in FIG. 10A, table 16 of call forwarding information for the terminal A is stored as shown in FIG. 10B. The office 11 includes an electronic switching network 17 accommodating a subscriber terminal B, a central control unit 18, common channel signaling equipment (CSE) 19, and, a main memory (MM) 20. In the main memory 20 in FIG. 10A, a table 21 for call forwarding for the terminal B is stored as shown in FIG. 10B. The subscriber terminal A accommodated by the switching network 12 is connected through a communication line 22 to the subscriber terminal B accommodated by the switching network 17. In the area a of the table 16, "0" is stored in this example, meaning that the terminal A is not yet registered as an alternative destination for call forwarding. In the area b of the table 16, the dial number (DN) of the subscriber terminal B is stored. Similarly, in the area a of the table 21, "1" is stored in this example, meaning that the terminal B is registered as an alternative destination for call forwarding.

The control in the call forwarding from the subscriber terminal A of the first office to the subscriber terminal B of the second office is carried out through a common signaling line 23 connected between the common signaling line equipment 14 and 19.

Figure 11C:
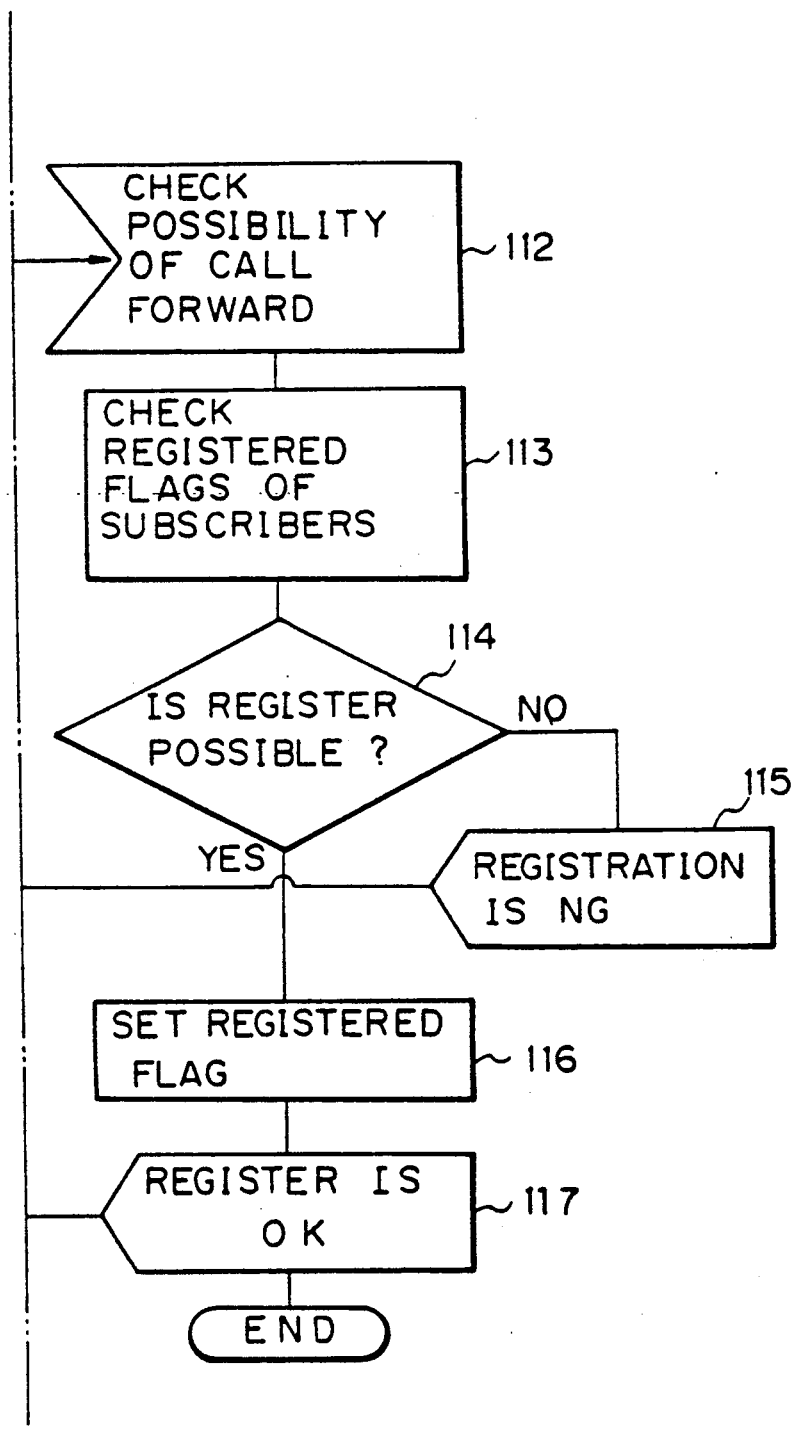

FIG. 11, including FIGS. 11A–11C is a flowchart for explaining the call forward registration between offices for example in the system shown in FIG. 10, according to the above-mentioned embodiment of the present invention. In FIG. 11A, steps 501 to 505 are the same as those in FIG. 5 except that when the discrimination at the step 501 is "NO", the process goes to a step 111 in FIG. 11B wherein the first office 10 requests the second office 11 to check whether call forwarding is possible to a subscriber terminal in the second office 11. In response to the request in the step 111 from the first office 10, the second office 11 conducts, at step 112 in FIG. 11C, a check as to whether or not the call forwarding is possible by checking the flag in the table of the terminal which is designated as an alternative destination. As a result of the check, if the table is filled with flags "1", the further registration of a terminal as an alternative destination is inhibited in the same way as in the step 503. On the other hand, if there is no flag "1", the registration is determined to be possible (see steps 113 to 117 in FIG. 11C), The first, office 10 receives one of these results at step 118 in FIG. 11B, and in accordance with the received result, if the registration is impossible, a step 120 in FIG. 11B, which is the same as the step 503 in FIG. 11A, is executed. If the registration is possible, the same process as the step 505 is executed at step 121. The signals from the step 111 in the first office 10 to the step 112 in the second office 11, and from the steps 115 and 117 in the second office to the steps 118 in the first office are transmitted through the common signaling line 23 in FIG. 10A.

Note that, in FIG. 5 and FIG. 11A, the sequence from the step 504 to the step 505 can be changed to be from the step 505 to the step 504. Namely, after it is determined that the call forwarding is possible at the step 502, the identification number of the terminal designated as an alternative destination may first be registered for the call forward, and then the flag "1" may be set in the area a of the call forward table corresponding to the subscriber terminal designated as the alternative destination.

Also, note that, in the step 502 in FIG. 5, the discrimination of whether or not the call forward from one subscriber terminal to a designated subscriber terminal is possible can be effected not only by reading the discrimination information in the area a of the designated subscriber terminal as in the above-described embodiments, but can also be effected, according to still another embodiment for the present invention, by reading the discrimination information in the area a of the designating subscriber terminal, i.e., the originating subscriber terminal. By checking the discrimination information of the originating terminal, the execution of the call forwarding shown in FIG. 7B can be eliminated as will be seen from the following description.

Namely, in this other embodiment, the registered discrimination information also represents whether or not the terminal is already registered as an alternative terminal of an another terminal. During registration of the call forwarding from a first terminal to a second terminal, instead of checking the discrimination information of the second terminal designated as an alternative terminal as in the first embodiment, the discrimination information of the first terminal, i.e., the originating terminal, is checked in this embodiment. If the discrimination information indicates that the first terminal is not yet registered as an alternative destination from any other terminal, the registration of the second terminal as an alternative terminal is allowed by setting the discrimination information of the second terminal, and the identification number of the subscriber terminal designated as the alternative destination is registered in the area b of the originating terminal in the same way as in the first embodiment. If the discrimination information indicates that the first terminal is already registered as an alternative destination from any other terminal, the registration of the second terminal as an alternative terminal is inhibited so that the endless loop can also be prevented during the call forward registration.

After the registration from C to D, from B to C, from A to B, and from Z to A as shown in FIG. 7A, the registration from D to A is inhibited in this embodiment because the terminal D is already registered as an alternative destination from the terminal C. Accordingly, in this embodiment, the steps shown in FIG. 7B for storing and comparing the data A are not necessary in this embodiment.

As described above, according to the embodiments of the present invention, registration of a single and the same subscriber terminal as an alternative destination from a plurality of subscriber terminals is inhibited. Therefore, the generation of an endless loop in a call forwarding process can be previously avoided at the stage of the registration for call forwarding before execution of the call forwarding process. As a result, the avoidance of the endless loop state can be ensured and the wasteful use of equipment during the execution of call forwarding can be eliminated.

We claim:

1. An electronic switching system having a call-forwarding function for effecting a call forwarding between subscribers, comprising:
   a plurality of subscriber terminals;
   a switching network accommodating said subscriber terminals;

a storage unit, connected to said switching network, for storing data used to forward calls for said subscriber terminals;

discrimination information adding means, connected to said storage unit, for adding discrimination information to the data for respective ones of said subscriber terminals, said discrimination information indicating whether or not each of said subscriber terminals is already registered as an alternative destination from another one of said subscriber terminals accommodated by said switching network;

discrimination information reading means, connected to said discrimination information adding means, for reading, when a call forwarding from a first one of said subscriber terminals to a second one of said subscriber terminals is to be registered in said storage unit, said discrimination information of said second one of said subscriber terminals; and determining means for determining whether the registration of a call forwarding is possible when a call requesting registration of a call forward is generated;

whereby, when the read discrimination information indicates that said second one of said subscriber terminals is not registered as an alternative destination, said second one of said subscriber terminals is allowed to be registered as an alternative destination, and when the read discrimination information indicates that said second one of said subscriber terminals is already registered as an alternative destination, said second one of said subscriber terminals is inhibited from being registered as an alternative destination.

2. An electronic switching system as claimed in claim 1, wherein said call forwarding is executed when the called destination does not respond within a predetermined time.

3. An electronic switching system as claimed in claim 1, wherein said call forwarding is executed when a call forwarding busy line state signal is present on one of said subscriber terminals.

4. An electronic switching system as claimed in claim 1, wherein said call forwarding is executed when a call forwarding-don't (no) answer state signal is present on one of said subscriber terminals.

5. An electronic switching system as claimed in claim 1, further comprising:
a storage area for storing, during an execution of a call forwarding, first subscriber information of said first one of said subscriber terminals which is a first incoming terminal and which is registered as a terminal for forwarding the incoming call to said second one of said subscribed terminals;

comparing means, connected to said storage area, for comparing, when said second one of said subscriber terminals is registered as a terminal for forwarding the incoming call to a third one of said subscriber terminals, said first subscriber information of said first one of said subscriber terminals with second subscriber information of said third one of said subscriber terminals;

whereby, as a result of the comparison, when said first subscriber information coincides with said second subscriber information, the forwarding to said third one of said subscriber terminals is inhibited, and when said first subscriber information does not coincide with said second subscriber information, the forwarding to said third one of said subscriber terminals is allowed.

6. An electronic switching system as claimed in claim 1, further comprising:
call forwarding means for forwarding a call from said electronic switching system to another electronic switching system;

said another electronic switching system comprising:
a plurality of subscriber terminals;
a switching network accommodating said subscriber terminals;
storage means, connected to said switching network, for storing data used to forward calls for subscriber terminals;
discrimination information adding means, connected to said storage means, for adding discrimination information to said data for respective subscriber terminals, said discrimination information indicating whether or not each of said subscriber terminals is already registered as an alternative destination from another one of said subscriber terminals;
discrimination information reading means, connected to said discrimination information adding means, for reading, when a call forwarding from one of said subscriber terminals to another one of said subscriber terminals is to be registered in said storage unit, said discrimination information of said another one of said subscriber terminals;
whereby, when a call forwarding between said another one of said subscriber terminals is to be registered, and when the read discrimination information indicates that said another one of said subscriber terminals is not registered as an alternative destination, said another one of said subscriber terminals is allowed to be registered as an alternative destination, and when the read discrimination information indicates that said another one of said subscriber terminals is already registered as an alternative destination, said another one of said subscriber terminals is inhibited from being registered as an alternative destination.

7. An electronic switching system as claimed in claim 6, wherein control signals between said electronic switching systems are transmitted and received through a common signaling link.

8. An electronic switching system having a call-forwarding function for effecting a call forwarding between subscribers, comprising:
a plurality of subscriber terminals;
a switching network accommodating said subscriber terminals;
storage means, connected to said switching network, for storing data used to forward calls for said subscriber terminals;
discrimination information adding means, connected to said storage means, for adding discrimination information to said data for respective subscriber terminals, said discrimination information indicating whether or not each of said subscriber terminals is already registered as an alternative destination from other subscriber terminals accommodated by said switching network;
discrimination information reading means, connected to said discrimination information adding means, for reading, when a call forwarding from one of said subscriber terminals to another one of said subscriber terminals is to be registered in said storage unit, said discrimination information of said another one of said subscriber terminals; and determining means for determining whether the registration of a call forwarding is possible when a call requesting registration of a call forwarding is generated;

whereby, when the read discrimination information indicates that said one of said subscriber terminals is not registered ny another one of said subscriber terminals as an alternative destination, said another one of said subscriber terminals is allowed to be registered as an alternative destination, and when the read discrimination information indicates that said one of said subscriber terminals is already registered by another one of said subscriber terminals as an alternative destination, said another one of said subscriber terminals is inhibited from being registered as an alternative destination.

9. An electronic switching system as claimed in claim 8, wherein said call forwarding is executed when the called destination does not respond within a predetermined time.

10. An electronic switching system as claimed in claim 8, wherein said call forwarding is executed when a call forwarding busy line state signal is present on one of said subscriber terminals.

11. An electronic switching system as claimed in claim 8, wherein said call forwarding is executed when a call forwarding-don't (no) answer state signal is present on one of said subscriber terminals.

12. An electronic switching system as claimed in claim 8, further comprising:

call forwarding means for forwarding a call from said electronic switching system to another electronic switching system;

said another electronic switching system comprising:

a plurality of subscriber terminals;

a switching network accommodating said subscriber terminals;

storage means, connected to said switching network, for storing data used to forward calls for subscriber terminals;

discrimination information adding means, connected to said storage means, for adding discrimination information to said data for respective subscriber terminals, said discrimination information indicating whether or not each of said subscriber terminals is already registered as an alternative destination from other ones of said subscriber terminals;

discrimination information reading means, connected to said discrimination information adding means, for reading, when a call forwarding from one of said subscriber terminals to another one of said subscriber terminals is to be registered in said storage means, said discrimination information of said one of said subscriber terminals;

whereby, when the read discrimination information indicates that said one of said subscriber terminals is not registered by another one of said subscriber terminals as an alternative destination, said another one of said subscriber terminals is allowed to be registered as an alternative destination, and when the read discrimination information indicates that said one of said subscriber terminals is already registered by another one of said subscriber terminals as an alternative destination, said another one of said subscriber terminals is inhibited from being registered as an alternative destination.

13. An electronic switching system as claimed in claim 12, wherein control signals between said electronic switching systems are transmitted and received through a common signaling link.

* * * * *

UNITED STATES PATENT AND TRADEMARK OFFICE
CERTIFICATE OF CORRECTION

PATENT NO.  : 5,018,194
DATED       : MAY 21, 1991
INVENTOR(S) : TAKASHI SUZUKI ET AL.

It is certified that error appears in the above-identified patent and that said Letters Patent is hereby corrected as shown below:

Title Page, [57] ABSTRACT,
   line 7, "elternative" should be --alternative--.

Col.  4, line 42, "subscriber" should be deleted.

Col.  6, line 54, "area a" should be --area b--.

Col. 13, line  1, "unit" should be --means--;
         line  9, "ny" should be --by--.

Col. 14, line  5, "for subscriber" should be --for said subscriber--;
         line 12, "registered" should be --specified--.

Col. 13, line 2, "another" should be deleted.

Signed and Sealed this

Twentieth Day of October, 1992

Attest:

DOUGLAS B. COMER

*Attesting Officer*    *Acting Commissioner of Patents and Trademarks*